Dec. 11, 1923.
J. R. SALINAS
FLYCATCHER
Filed Oct. 17, 1922
1,477,081
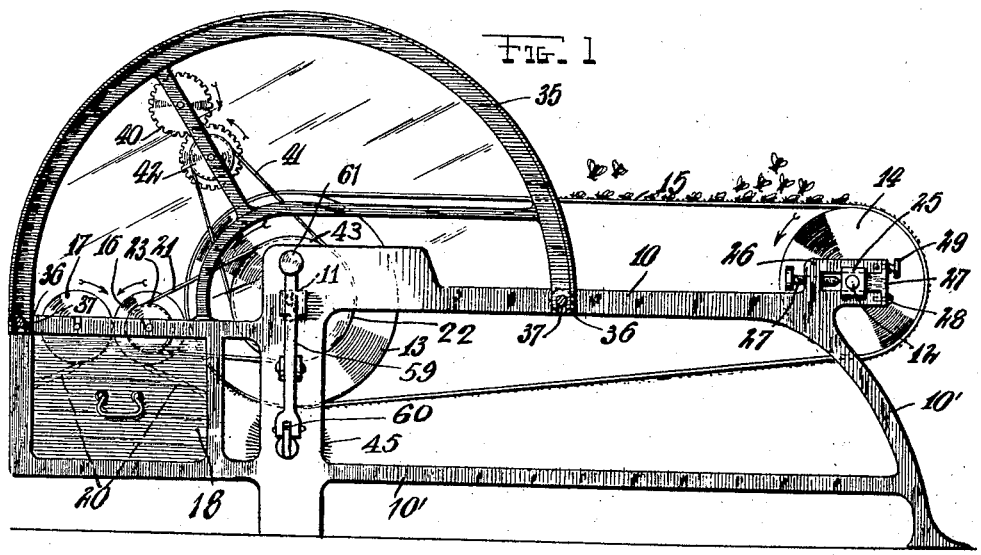
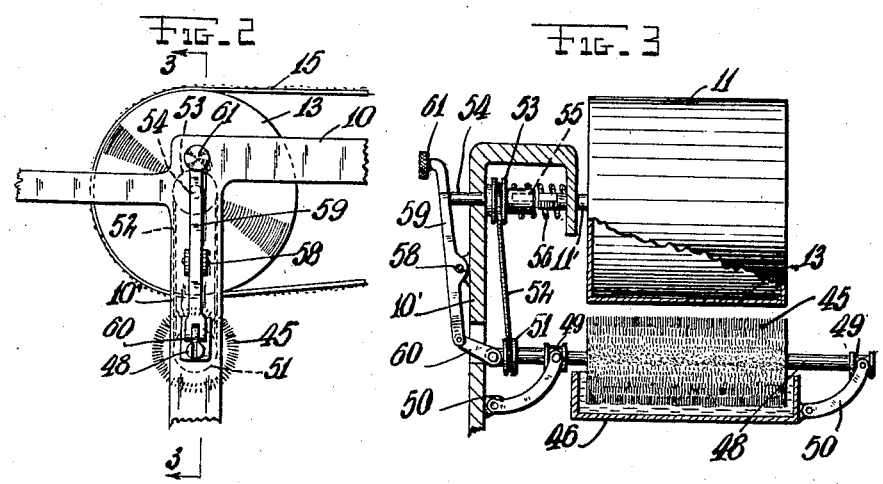
Inventor
José R. Salinas
By [signature]
Attorney Patented Dec. 11, 1923.

1,477,081

UNITED STATES PATENT OFFICE.

JOSÉ R. SALINAS, OF MONTERREY, MEXICO.

FLYCATCHER.

Application filed October 17, 1922. Serial No. 595,158.

*To all whom it may concern:*

Be it known that I, José R. Salinas, a citizen of Mexico, residing at Monterrey, in the State of Nuevo Leon and Republic of Mexico, have invented certain new and useful Improvements in Flycatchers, of which the following is a specification.

This invention relates to a fly catching device, having particular reference to a device which operates by catching the flies on an adhesive medium and then removing the flies therefrom.

The invention has for an object the provision of a novel fly catching device of the above type by means of which an adhesive carrier of limited surface may be reexposed a plurality of times, the flies collected thereon being removed therefrom between each exposure.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a fly-catching machine constructed according to my invention.

Fig. 2 is a fragmentary side view showing the paste applying device.

Fig. 3 is a transverse vertical sectional view taken on the line 3—3 of Fig. 2.

In constructing my improved fly-catching machine I provide an elongated frame 10 having suitable legs 10'. Journaled in this frame, toward opposite ends thereof, are shafts 11 and 12 on which are fixed drums 13 and 14 respectively. These drums have an endless band or apron 15 looped thereover, a suitable fly-catching liquid adhesive being applied to the outer face of this apron.

The parts are arranged to have the top reach of the apron travel toward the drum 13. Located in front of this drum 13, and in contact therewith, is a roller 16 adjacent which is another roller 17 contacting with the roller 16. Suitably supported under these two rollers is a receptacle 18 to receive the flies which are removed from the apron by the roller 16, passing down between the rollers and being removed from the latter by scrapers 20. The roller 16 is driven in opposition to the drum 13 by means of a belt 21 looped over pulleys 22 and 23 co-axially fixed to the drum and roller respectively.

In order to properly tension the apron 15 I provide adjustment devices for moving the shaft 12 transversely to itself, the shaft engaging at each end in a bearing block 25 slidable in a guide 26 formed on the frame 10. An adjusting screw 27 is threaded through the guide 26 and bears on the block 25. The end of the guide 26 is closed by a plate 27 pivoted at one end as at 28 to the frame and secured by a set screw 29 at its opposite end. To permit of ready removal of the drum 13 its shaft engages at each end in a bearing block 30 held in place by a swingable plate 31 pivoted as at 32 and locked by a set screw 33.

The drum 13 and rollers 16, 17 covered by a semi-cylindrical housing 35 have transparent walls and are provided at one side with a suitable opening to receive the apron. This housing has forked lower ends 36 which rest on screws 37 threaded into the sides of the frame 10, the heads of these screws being tightened against the forked ends to hold the housing in place.

The drum 13 is driven from a clock mechanism indicated generally at 40 and which is connected to the drum by a belt 41 looped over a pulley 42 forming part of the drive mechanism and over a second pulley 43 on the shaft 11, the pulley 42 and belt 41 being outside the housing 35 so as to permit of ready removal of the belt when access to the interior of the housing is desired.

In Figs. 2 and 3 I have shown in detail an arrangement whereby the adhesive may be applied to the apron 15. This comprises a rotary brush 45 located under the drum 11 and dipping into a suitably supported fountain 46 containing the adhesive. The brush 45 is fixed on a shaft 48 which is supported by collars 49 carried in the upper ends of parallel links 50 whose other ends are pivoted to suitable fixed parts. Upon shaft 48 is a pulley 51 over which is looped an elastic belt 52 engaged also over a pulley 53 on a stub shaft 54 slidable in the side of the frame 10' and having on its inner end a square socket 55 adapted to engage over the squared end of the drum supporting shaft 11, an expansion spring 56 holding these parts disengaged. Fulcrumed between its ends as at 58 to the outside of the frame 10 is a lever 59 one end of which is adapted to bear on the stub shaft 54, the other end being connected by a link 60 with the brush shaft 48. The first mentioned end of the lever 59 has a push button 61 fixed thereon, and it will be obvious that by pressing thereon the brush 36 will be raised into contact with the apron 13 and a drive connection will be effected between the drum 11 and the brush.

In Fig. 1 of the drawings the brush 45 is indicated in raised position engaging the apron, while in Figs. 2 and 3 it is indicated in lowered position.

Having thus described my invention what I claim as new and desire to protect by Letters Patent of the United States is as follows:

1. A fly-catching device comprising a casing, a pair of drums journaled therein, an endless apron looped over said drums, a pair of rollers contacting with one another, one of said rollers contacting with said apron, scrapers engaging said rollers, and means for advancing said apron and rotating said rollers.

2. A fly-catching device comprising a casing, a pair of drums journaled therein, an endless apron looped over said drums, a pair of rollers contacting with one another, one of said rollers contacting with said apron, scrapers engaging said rollers, and means for advancing said apron and rotating said rollers, said means being adapted to cause the roller in contact with the apron to move in opposition thereto.

3. A fly-catching device, comprising a traveling apron having an adhesive applied thereto, and an element in contact therewith to remove the flies therefrom, a fountain containing the adhesive to be applied to the apron, a rotary brush dipping into said fountain, and means for moving said brush bodily into and out of engagement with said apron.

4. A fly-catching device, comprising a traveling apron having an adhesive applied thereto, and an element in contact therewith to remove the flies therefrom, drive means for said apron, a fountain containing the adhesive to be applied to the apron, a rotary brush dipping into said fountain, and a unitary manually controlled means for moving said brush bodily into and out of engagement with the apron and effecting an operative connection between the said drive means and the brush.

In testimony whereof I have affixed my signature.

JOSÉ R. SALINAS.